United States Patent [19]

Ishida et al.

[11] 4,280,101
[45] Jul. 21, 1981

[54] STEREOPHONIC SIGNAL DEMODULATION CIRCUIT

[75] Inventors: Kohji Ishida; Tatsuo Numata, both of Tokyo, Japan

[73] Assignee: Pioneer Electronic Corporation, Tokyo, Japan

[21] Appl. No.: 54,117

[22] Filed: Jul. 2, 1979

[30] Foreign Application Priority Data

Jun. 30, 1978 [JP] Japan ................................. 53-80008

[51] Int. Cl.³ ............................................. H03D 1/00
[52] U.S. Cl. .............................. 329/167; 179/1 GM; 179/1 GE
[58] Field of Search ............... 329/167, 50; 179/1 GJ, 179/1 GD, 1 GE, 1 GH, 1 GM, 1 GN

[56] References Cited

U.S. PATENT DOCUMENTS 3,573,382  4/1971  Feit ..................................... 179/1 GE
3,916,109  10/1975  Gay ..................................... 179/1 GE Primary Examiner—David K. Moore
Attorney, Agent, or Firm—Sughrue, Rothwell, Mion, Zinn and Macpeak

[57] ABSTRACT

A stereophonic signal demodulation circuit receives an input signal including a signal modulated with first and second channel information to separate the first and second channel information from each other. The circuit includes first and second operational amplifiers and at least two switching devices namely, first and second switches for applying the input signal through respective resistors to one input terminal of the first operational amplifier and third and fourth switches for applying the input signal through respective resistors to one input terminal of the second operational amplifier. A control device controls the operations of the first through fourth switches and the first and second operational amplifiers outputs first and second channel information, respectively.

14 Claims, 2 Drawing Figures

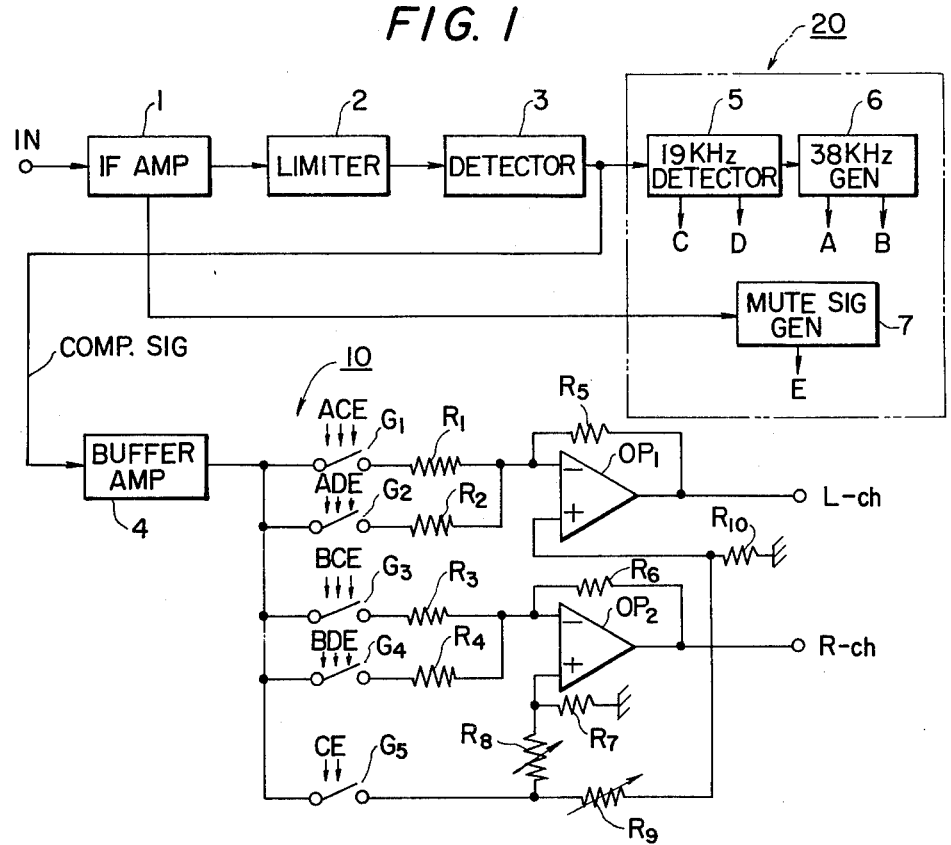
FIG. 1
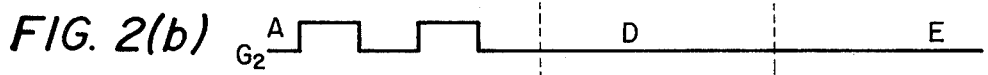
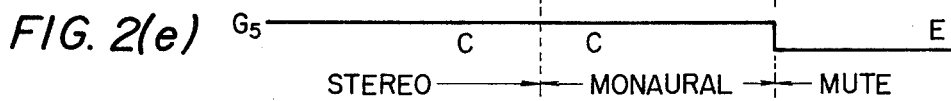

STEREOPHONIC SIGNAL DEMODULATION CIRCUIT

BACKGROUND OF THE INVENTION

This invention relates to stereophonic signal demodulation circuits, and more particularly to an FM multiplex (MPX) stereophonic signal demodulation circuit.

Heretofore, a double balanced type demodulation circuit comprising differential amplifiers has been employed as an FM MPX stereophonic signal demodulation circuit. In this conventional demodulation circuit, the differential amplifiers are cascade-connected in a two-stage state, and therefore the power supply utilization factor is low. It is impossible to increase the dynamic range. Furthermore, since the signal distortion of the differential transistors in the stages are superposed, it is difficult to reduce the distortion factor. In addition, because of the unbalance in characteristic of the differential transistors, distortion occurs, and the right and left channel signals become different in level.

Moreover, for muting operation in selecting an FM broadcast station, it is necessary to provide a particular muting circuit in the rear stage of the double balance type demodulation circuit.

Thus, the conventional demodulation circuit suffers from various difficulties as described above.

SUMMARY OF THE INVENTION

Accordingly, an object of this invention is to provide an MPX stereophonic signal demodulation circuit in which the above-described drawbacks such as dynamic range reduction, distortion factor increase and the provision of a muting circuit accompanying the conventional double balance type demodulation circuit have been eliminated.

A further object of this invention is to provide an MPX demodulation circuit where the output signal level in receiving a stereophonic signal is equal to that in receiving a monaural signal.

Another object of the invention is to provide an MPX stereophonic signal demodulation circuit which is simple in arrangement to achieve right and left signal separation.

These and other objects of this invention are achieved by a stereophonic signal demodulation circuit which receives an input signal including a signal modulated with first and second channel information to separate the first and second channel information from each other. The circuit comprises: first and second operational amplifiers; and at least two switching devices, namely, first and second switches for applying the input signal through respective resistors to one input terminal of the first operational amplifier. At least other two switching devices are provided, namely, third and fourth switches for applying the input signal through respective resistors to one input terminal of the second operational amplifier. A control device controls the operations of the first through fourth switches. The first and second operational amplifiers output first and second channel information, respectively.

The control device comprises a circuit for generating a control signal according to the modulated signal and a circuit for generating a signal opposite in phase to the control signal. The first and second switches are controlled by the control signal, and the third and fourth switches means are controlled by the signal opposite in phase to the control signal.

This invention will be described with reference to the accompanying drawing and the description of the preferred embodiment that follows.

BRIEF DESCRIPTION OF THE DRAWINGS

FIG. 1 is a block diagram showing an FM receiver to which one embodiment of this invention is applied; and FIG. 2 is a diagram for a description of the control states of switches shown in FIG. 1.

DESCRIPTION OF THE PREFERRED EMBODIMENT

FIG. 1 is a block diagram showing one embodiment of the invention. An intermediate frequency signal from a front end (not shown) is subjected to intermediate frequency amplification by an intermediate frequency (IF) amplifier 1 and is then subjected to amplitude limitation by a limiter 2. Thereafter, the signal thus treated is subjected to FM detection by an FM detection circuit 3, and a so-called "composite signal" is obtained.

This composite signal includes a main signal which is the sum component of the left (L) channel signal and the right (R) channel signal, an auxiliary signal obtained by amplitude-modulating a subcarrier signal (38 KHz) with the difference component of the right and left channel signals, and a pilot signal 19 KHz. The composite signal is demodulated into a left (L) signal and a right (R) signal by an MPX (multiplex) stereophonic signal demodulation circuit 10.

In the demodulation circuit 10 of the invention, the composite signal is applied through a buffer amplifier 4 comprising, for instance, an operational amplifier to switching means, namely, analog switches G1 through G5. The analog switches G1 through G5 may be for example CMOS transistors. However, it is apparent that they can be made up of other switching elements. The outputs of the switches G1 and G2 are applied respectively through resistors R1 and R2 to the inversion input terminal of an operational amplifier OP1, the non-inversion input terminal of which is grounded through a resistor R10. A feedback resistor R5 is connected between the inversion input terminal and the output terminal of the operational amplifier OP1, to provide an inversion amplifier.

The outputs of the switches G3 and G4 are applied respectively through resistors R3 and R4 to the inversion input terminal of an operational amplifier OP2, the non-inversion input terminal of which is grounded through a resistor R7. A feedback resistor R6 is connected between the output terminal and the inversion input terminal of the operational amplifier OP2, to form an inversion amplifier.

The output of the switch G5 is applied through variable resistors R8 and R9 to the non-inversion input terminals of the operational amplifiers OP1 and OP2, respectively.

A control signal generating circuit 20 is provided to control the conductive and non-conductive states of the switches G1 through G5. In the control signal generating circuit 20, the 19 KHz pilot signal is detected from the composite signal by a 19 KHz detection circuit 5, and this 19 KHz signal is modulated into a 38 KHz signal A in phase with the subcarrier signal and a signal B opposite in phase to the signal A, both being provided by a 38 KHz signal generating circuit 6. The 19 KHz detection circuit 5 is designed so that it outputs a high level signal C and a low level signal D when no pilot signal is available, i.e. when a monaural signal is received. It outputs high level signals C and D when a stereophonic signal is received. The control signal generating circuit 20 further comprises a mute signal generating circuit 7 which detects the signal of the IF amplifier 1 to generate a mute signal E. The mute signal generating circuit 7 detects the fact that the IF signal includes no stereophonic signal, to provide the low level mute control signal E.

In the circuitry thus organized, first in receiving a stereophonic signal the switches G1 and G2 are controlled by the signal A (FIG. 2, (a) and (b)) in phase with the subcarrier signal, while the switches G3 and G4 are controlled by the opposite phase signal B (FIG. 2, (c) and (d)). If the switch G5 is designed to be controlled by the high level signal C (FIG. 2, (e)) from the 19 KHz detection circuit, and all of the switches are designed to be rendered conductive (on) by a high level control signal, then when the subcarrier is at the high level, the switches G1 and G2 are turned on, while the switches G3 and G4 are turned off. During this period, the composite signal is subjected to inversion and amplification and produced by the operational amplifier OP1. For the period in which the composite signal is in phase with the subcarrier signal, the composite signal includes the L channel component, and therefore the output of the operational amplifier OP1 is the L channel information. In this case, the amplification gain of the operational amplifier OP1 is represented by R5/(R1//R2). Therefore, if R1=R2=R, then the amplification gain is 2·R5/R. (R1//R2 is the parallel combined resistance of R1 and R2).

It is obvious that when the subcarrier is at the low level, the composite signal is subjected to inversion and amplification and outputted by the other operational amplifier OP2. During this period, the composite signal includes the R channel information component, and therefore the output of the operational amplifier OP2 is the R channel information. In this case, the gain of the operational amplifier is represented by R6/(R3//R4). Therefore, if R3=R4=R, then the gain is 2·R6/R. Accordingly, if R5=R6, then the R channel signal can be outputted with the same level.

At the time of receiving a stereophonic signal, the switch G5 is turned on by the control signal C. Therefore, the amplitude of the composite signal is adjusted by the variable resistors R8 and R9 and the composite signal thus treated is applied to the non-inversion input terminals of the operational amplifiers OP1 and OP2. As a result, the composite signal and the L and R channel signals are subjected to subtraction in the operational amplifiers OP1 and OP2, respectively. Therefore right and left channel separation can be achieved by adjusting the resistance of the variable resistors R8 and R9.

In the case where the right and left channel signals are equal, i.e. in the case of monaural signal reception, the high level control signal C is applied to the switches G1, G3 and G5, while the low level control signal D is applied to the switches G2 and G4 (cf. FIG. 2). Accordingly, the amplification gains of the inversion amplifiers OP1 and OP2 are R5/R, R6/R, respectively. That is, each of the gains is one half ($\frac{1}{2}$) of the gain obtained in the case of stereophonic signal reception. However, during the stereophonic signal reception the demodulation efficiency is set to $\frac{1}{2}$ by the switching operations of the switches G1 through G4 and therefore the output level at the time of receiving a stereophonic signal is equal to the output level at the time of receiving a monaural signal.

During muting operation, the low level mute control signal E is applied to all of the switches G1 through G5 and therefore transmission of the signal to the output section is blocked (cf. FIG. 2). Thus, the muting operation can be achieved simply but completely.

In the above-described embodiment of the invention, a first set of two parallel-connected switches G1 and G2 and a second set of two parallel-connected switches G3 and G4 are connected to the inversion input terminals of the operational amplifiers OP1 and OP2, respectively, and the series-connected resistors are equal in resistance. However, it is apparent that the same effect can be obtained by connecting at least three parallel-connected switches to the inversion input terminal of each operational amplifier and by suitably selecting the resistances of the series-connected resistors.

As is apparent from the above description, the demodulation circuit according to the invention is configured merely by inversion amplifiers and the switches. Therefore, the demodulation circuit according to the invention, unlike the conventional double balance type demodulation circuit, is free from drawbacks such as distortion factor increase, dynamic range decrease and the additional provision of a muting circuit. Thus, the demodulation circuit is high in performance.

Furthermore, the demodulation circuit of the invention is advantageous in that the signal level at the time of receiving a stereophonic signal is equal to the signal level at the time of receiving a monaural signal. In addition, with the simple circuit, the separation adjustment can be conducted separately for the L channel and the R channel.

What is claimed is:

1. In a stereophonic signal demodulation circuit which receives an input signal including a signal modulated with first and second channel information to separate said first and second channel information from each other, the improvement comprising: first and second operational amplifiers; a first switching means for applying said input signal to one input terminal of said first operational amplifier, a second switching means for applying said input signal to one input terminal of said second operational amplifier; and control means for controlling the operations of said first and second switching means; wherein said first and second operational amplifiers output said first and second channel information, respectively, and said first switching means comprises a parallel circuit of first and second switch elements each coupled to said first operational amplifier through first and second resistors, respectively, and said second switching means comprises a second parallel circuit of third and fourth switch elements each coupled to said second operational amplifier through third and fourth resistors, respectively.

2. The circuit as in claim 1 wherein said switch elements are analog switches.

3. The circuit as in claim 1 wherein said parallel circuits are coupled to inversion inputs of said operational amplifiers.

4. A circuit as claimed in claim 1, wherein said control means comprises: means for generating a control signal according to said modulated signal, and means for generating a signal opposite in phase to said control signal, said first switching means controlled by said control signal, and said second switching means are controlled by said signal opposite in phase to said control signal.

5. A circuit as claimed in claim 1 wherein said control means comprises means for generating a mute control signal controlling said first and second switching means.

6. A circuit as claimed in claim 1 wherein said control means comprises means which generates first and second control signals adapted to selectively open and close said first and second switching means to provide a monaural output, wherein said first control signal is applied to said first and third switch elements and said second control signal is applied to said second and fourth switch elements.

7. A circuit as claimed in claim 1 wherein said resistors are equal in resistance.

8. A circuit as in claim 1 further comprising a fifth switch element supplying a signal to non-inversion inputs of said operational amplifiers.

9. A circuit as in claim 8 further comprising variable resistance means for adjusting the separation of first and second channel information.

10. In a stereophonic signal demodulation circuit which receives an input signal including a signal modulated with first and second channel information to separate said first and second channel information from each other, the improvement comprising: first and second operational amplifiers; a first switching means comprising first and second switching elements for applying said input signal through respective resistors to one input terminal of said first operational amplifier; a second switching means, comprising third and fourth switching elements for applying said input signal through respective resistors to one input terminal of said second operational amplifier; means for controlling the amplitude of said input signal and applying said input signal thus controlled to the other input terminals of said first and second operational amplifiers; and control means for controlling the operations of said first through fourth switching elements, said first and second operational amplifiers outputting said first and second channel information, respectively.

11. In a stereophonic signal demodulation circuit which receives an input signal including a signal modulated with first and second channel information to separate said first and second channel information from each other, the improvement comprising: first and second operational amplifiers having outputs corresponding to said first and second channel information, respectively; a first switching means having a parallel circuit of first and second switch elements for applying said input signal to one input terminal of said first operational amplifier, a second switching means having a parallel circuit of third and fourth switch elements for applying said input signal to one input terminal of said second operational amplifier; and control means for controlling the operations of said first and second switching means whereby only said first and second switch elements or said third and fourth switch elements are on at a time to provide a stereo output, and only said first and third switch elements or said second and fourth switch elements are on at a time to provide a monaural output.

12. The circuit of claim 11 wherein said first and second switch elements are each coupled to said one input terminal of said first operational amplifier through first and second resistors, respectively, and said third and fourth switch elements are each coupled to said one input of said second operational amplifier through third and fourth resistors, respectively.

13. The circuit of claim 12 wherein said first and second operational amplifiers are provided with first and second feedback resistors, respectively.

14. The circuit of claim 13 wherein said first through fourth resistors are of a first equal value, and said first and second feedback resistors are of a second equal value, whereby the level of said stereo output is equal to the level of said monaural output.

* * * * *